(12) United States Patent
Williamson et al.

(10) Patent No.: US 8,967,195 B2
(45) Date of Patent: Mar. 3, 2015

(54) PRESSURE RELIEF VALVE WITH ORIFICE

(75) Inventors: Matthew Williamson, Richmond Hill (CA); Karthikeyan Ganesan, North York (CA)

(73) Assignee: Magra Powertrain of America, Inc., Troy, MI (US)

( * ) Notice: Subject to any disclaimer, the term of this patent is extended or adjusted under 35 U.S.C. 154(b) by 0 days.

(21) Appl. No.: 13/882,546

(22) PCT Filed: Oct. 28, 2011

(86) PCT No.: PCT/CA2011/001204
§ 371 (c)(1),
(2), (4) Date: May 16, 2013

(87) PCT Pub. No.: WO2012/058751
PCT Pub. Date: May 10, 2012

(65) Prior Publication Data
US 2013/0233413 A1 Sep. 12, 2013

Related U.S. Application Data

(60) Provisional application No. 61/408,761, filed on Nov. 1, 2010.

(51) Int. Cl.
| F16K 17/06 | (2006.01) |
| F16K 17/08 | (2006.01) |
| F16K 15/02 | (2006.01) |
| F16K 3/34  | (2006.01) |

(52) U.S. Cl.
CPC ............. *F16K 17/082* (2013.01); *F16K 15/025* (2013.01); *F16K 3/34* (2013.01)
USPC .................. 137/538; 137/516.27; 137/512.5; 417/307

(58) Field of Classification Search
CPC ............. F16K 15/025; F16K 17/0446; F16K 17/0433; G05D 16/10
USPC ............ 137/538, 512.5, 516.27, 565.01, 497; 417/310, 307
See application file for complete search history.

(56) References Cited

U.S. PATENT DOCUMENTS 2,305,519 A * 12/1942 Dunmire ...................... 137/538
3,972,345 A    8/1976 Court
(Continued)

FOREIGN PATENT DOCUMENTS

| CA | 2533801 A1 | 7/2006 |
| GB | 711606 | 7/1954 |

*Primary Examiner* — Kevin Lee
*Assistant Examiner* — P. Macade Nichols
(74) *Attorney, Agent, or Firm* — Dickinson Wright PLLC

(57) ABSTRACT

A pressure relief valve includes a housing including an inlet chamber adapted to be in communication with an outlet of a pump and an outlet chamber adapted to be in communication with a pump inlet. The housing includes a bore having a first end in communication with the inlet chamber and a main spill aperture in communication with the bore and the outlet chamber. A piston includes an orifice and an axially spaced apart aperture. The piston is axially moveable within the bore between a first position whereat the piston seals the inlet chamber from the outlet chamber, a second position whereat the inlet and outlet chambers are in fluid communication with one another via only the orifice, and a third position whereat the inlet and outlet chambers are in fluid communication with one another via the orifice and the aperture. A spring biases the piston toward the first position.

18 Claims, 13 Drawing Sheets

(56) References Cited

U.S. PATENT DOCUMENTS

| | | |
|---|---|---|
| 5,186,198 A | 2/1993 | Kennedy |
| 6,352,085 B1 * | 3/2002 | Morita et al. ............ 137/516.27 |
| 6,481,458 B2 * | 11/2002 | Hirano et al. ................. 137/538 |
| 2010/0078085 A1 | 4/2010 | Kurokawa et al. |

* cited by examiner

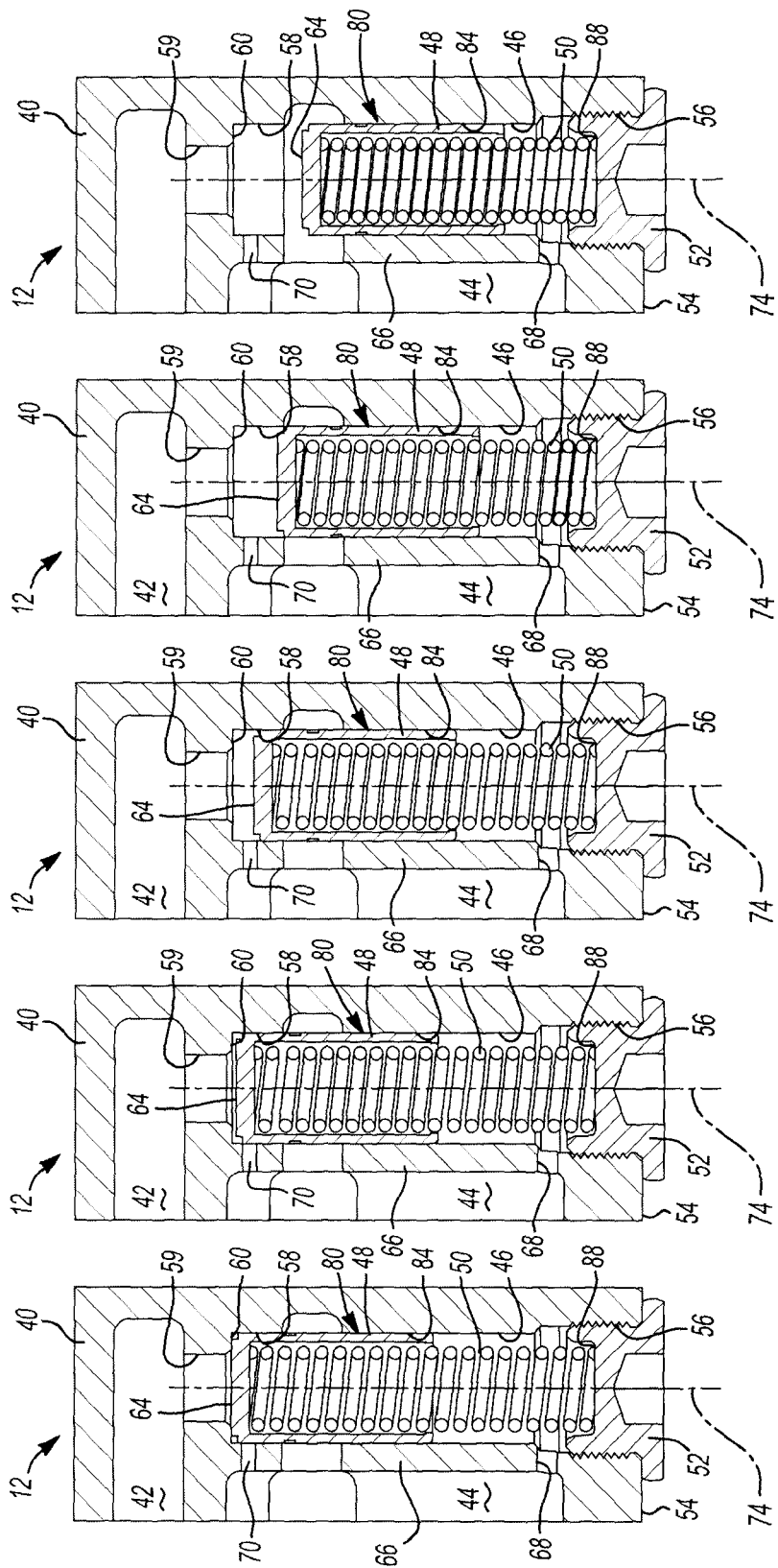

PRESSURE RELIEF VALVE WITH ORIFICE

CROSS-REFERENCE TO RELATED APPLICATIONS

This application is a U.S. National phase application claiming priority to International Application No. PCT/CA2011/001204 filed Oct. 28, 2011 which claims the benefit of U.S. Provisional Application No. 61/408,761, filed on Nov. 1, 2010. The entire disclosure of each of the above applications is incorporated herein by reference.

FIELD

The present disclosure relates to pressure relief valves for pumps. More specifically, a pressure relief valve includes multiple axially spaced apart outlet ports to provide reduced pump output at low to moderate operating speeds.

BACKGROUND

Fluid displacement pumps provide fluid at a volume flow rate that is proportional to the rotational speed of a pump input member. The fluid volume pumped per input member revolution is substantially constant. As such, the pump outputs a relatively high volume flow rate when the rotational speed of the pump input member is high. Depending on the application of the pump, an output volume flow rate greater than a desired flow rate may be provided.

In particular, many internal combustion engines are equipped with lubrication pumps to provide pressurized lubricant to one or more moving components. Typical lubrication pumps are sized to provide a maximum output pressure at a predetermined operating speed. Many vehicle engines are rarely operated at maximum speed where maximum pump output is required. The engine frequently operates at lower rotational speeds. At the lower engine speeds, the pump output may be greater than required. A higher output pressure is maintained than necessary. An inefficient conversion of energy to heat may result thereby reducing the efficiency of the engine and pump combination. While many lubrication pumps are equipped with a pressure relief valve to assure that a maximum pressure within the lubrication system is not exceeded, these simple systems do not address the need for a reduced pump output at low to moderate engine operating speeds.

Some engine lubrication systems attempt to include components to reduce the pump output in the low to moderate engine speed range of operation. The previously known arrangements, however, may include high cost solutions incorporating multiple relief valves, solenoids and other control hardware. As such, it may be beneficial to provide a simplified pressure relief valve for increasing the energy efficiency of a pump.

SUMMARY

This section provides a general summary of the disclosure, and is not a comprehensive disclosure of its full scope or all of its features.

A pressure relief valve includes a housing including an inlet chamber adapted to be in communication with an outlet of a pump and an outlet chamber adapted to be in communication with a pump inlet. The housing includes a bore having a first end in communication with the inlet chamber and a main spill aperture in communication with the bore and the outlet chamber. A piston includes an orifice and an axially spaced apart aperture. The piston is axially moveable within the bore between a first position whereat the piston seals the inlet chamber from the outlet chamber, a second position whereat the inlet and outlet chambers are in fluid communication with one another via only the orifice, and a third position whereat the inlet and outlet chambers are in fluid communication with one another via the orifice and the aperture. A spring biases the piston toward the first position.

A pressure relief valve comprises a housing including an inlet chamber and an outlet chamber. The housing includes a bore having a first end in communication with the inlet chamber, an orifice in communication with the outlet chamber, and a main spill aperture axially spaced apart from the orifice and in communication with the outlet chamber. A piston is axially moveable within the bore between a first position whereat the piston seals the inlet chamber from the outlet chamber, a second position whereat the inlet and outlet chambers are in fluid communication with one another via only the orifice, and a third position whereat the inlet and outlet chambers are in fluid communication with one another via the orifice and the main spill aperture. A spring biases the piston toward the first position.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 5:
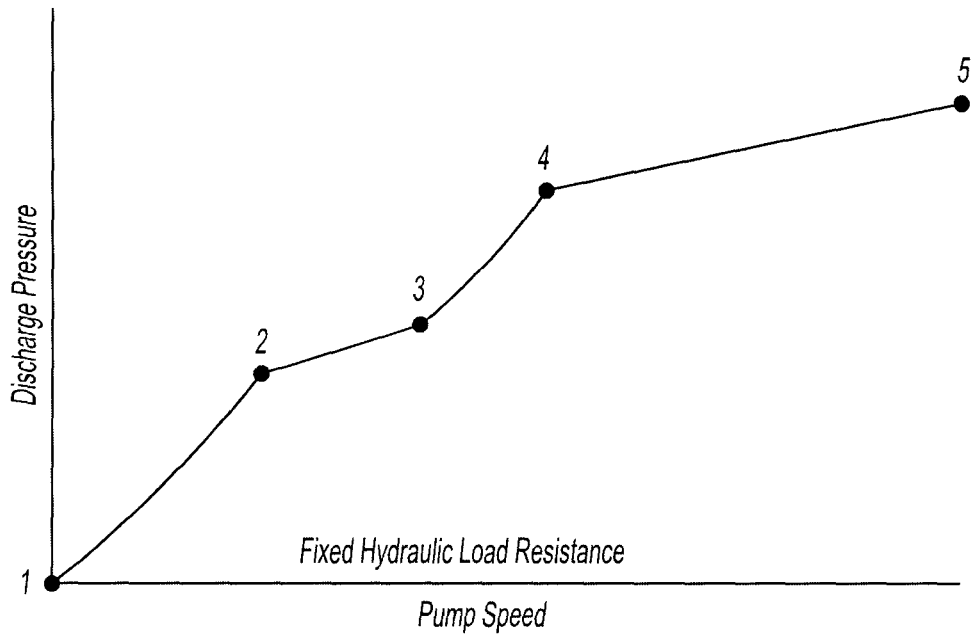
Figure 6:
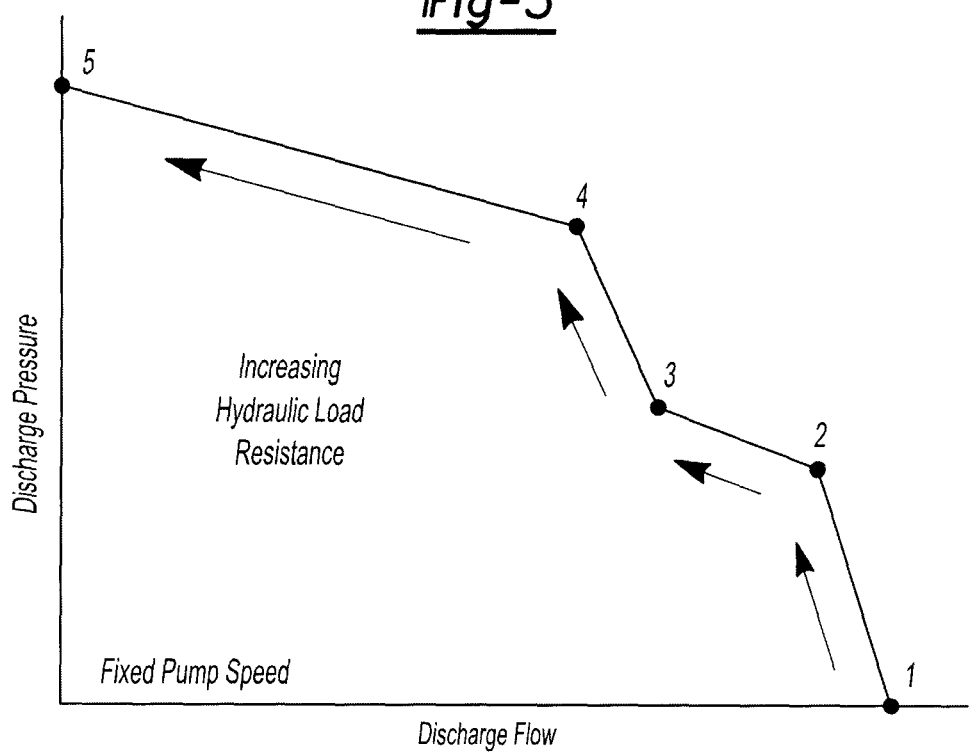
Figure 7:
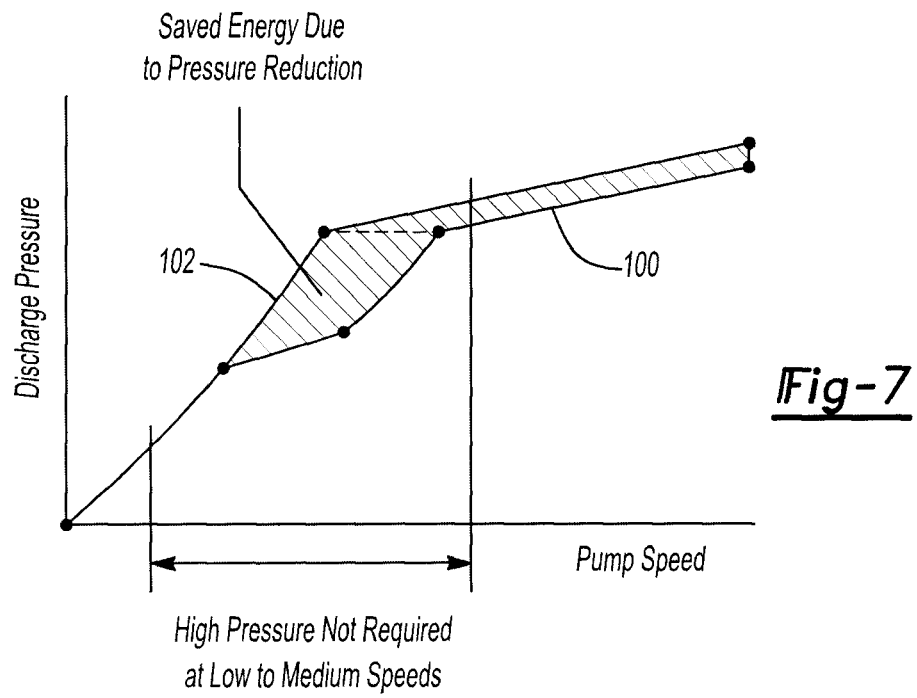
Figure 8:
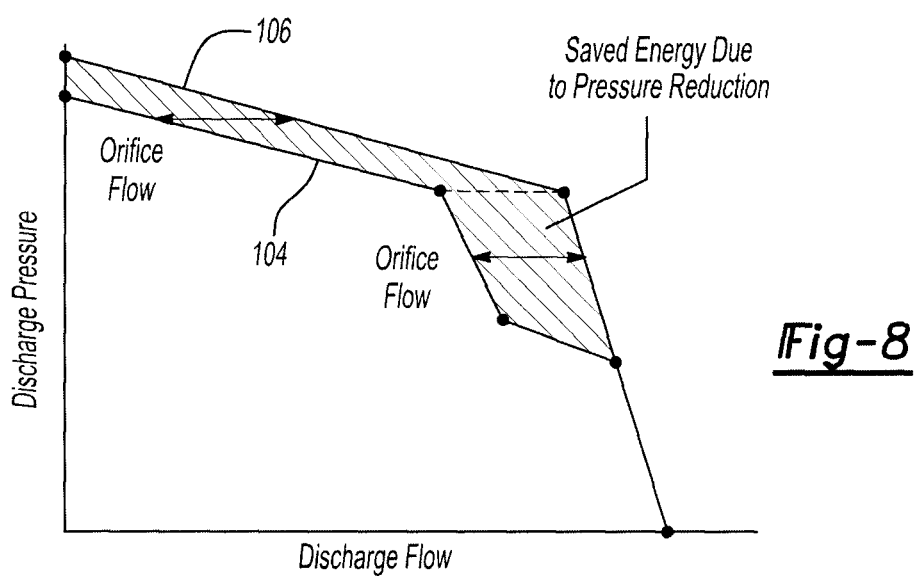
Figure 10:
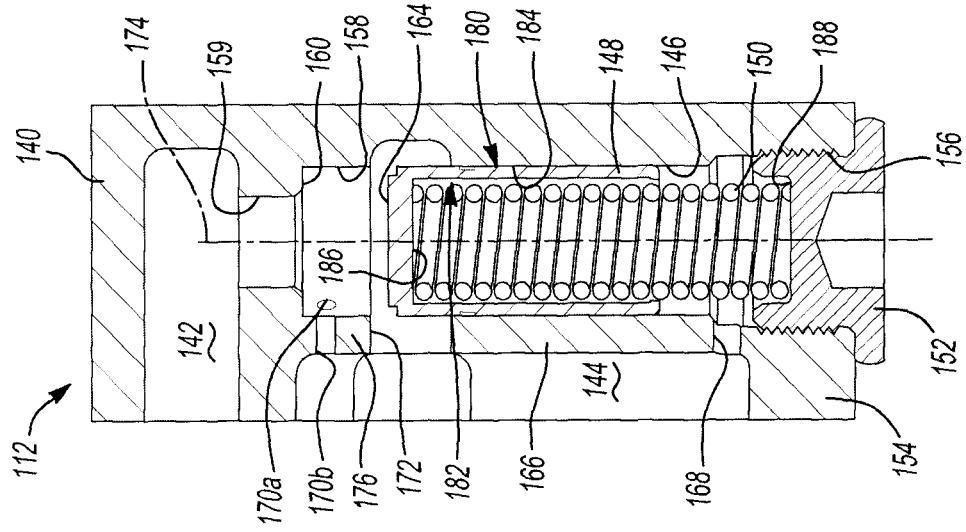
Figure 9:
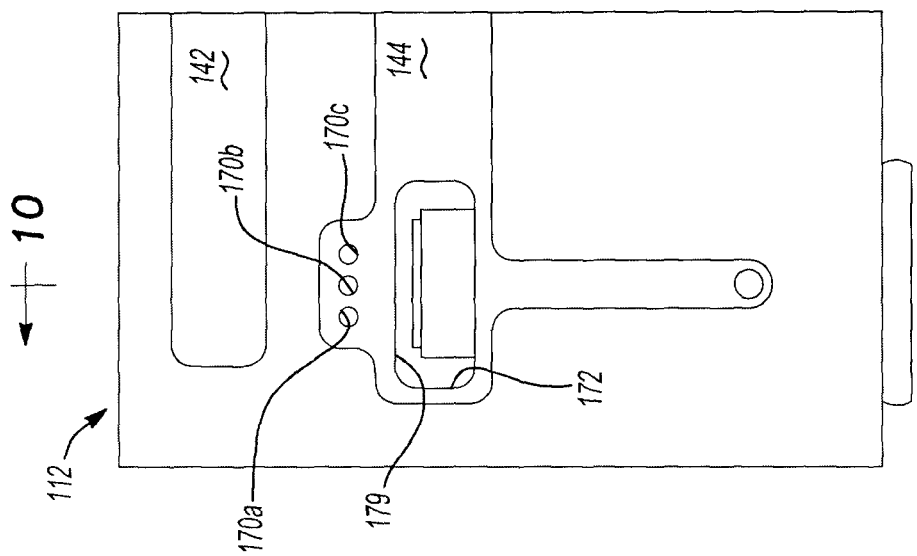
Figure 11:
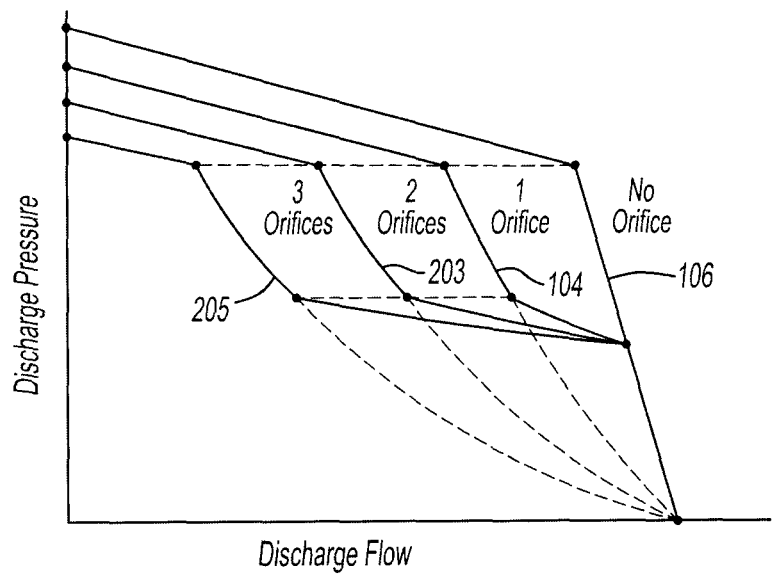
Figure 12:
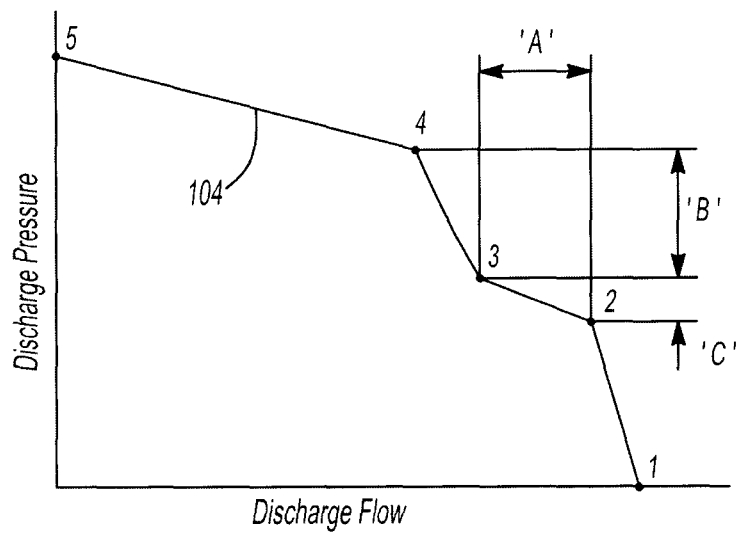
Figure 13:
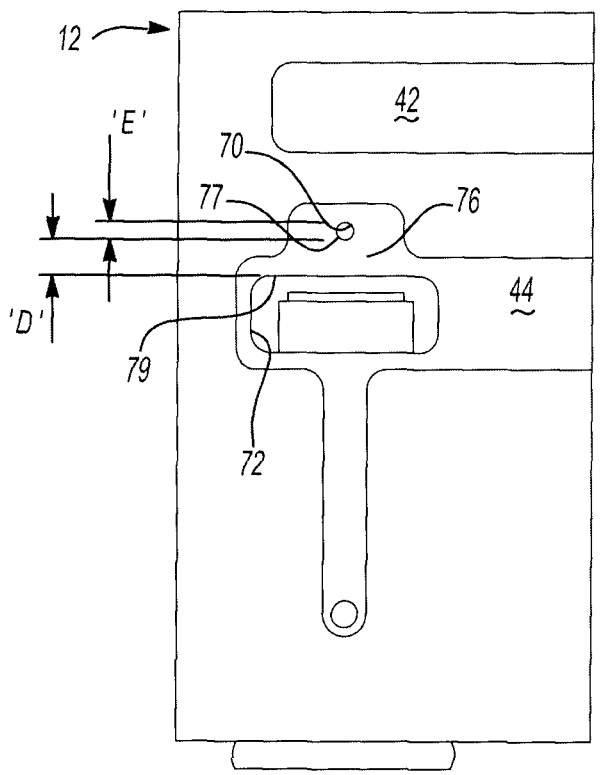
Figure 14:
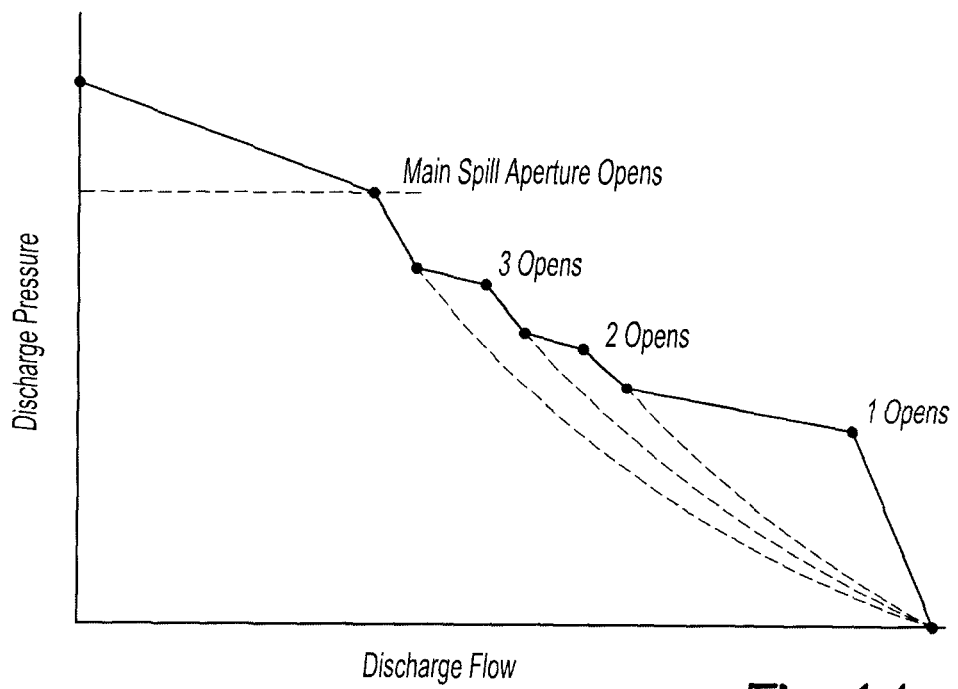
Figure 15:
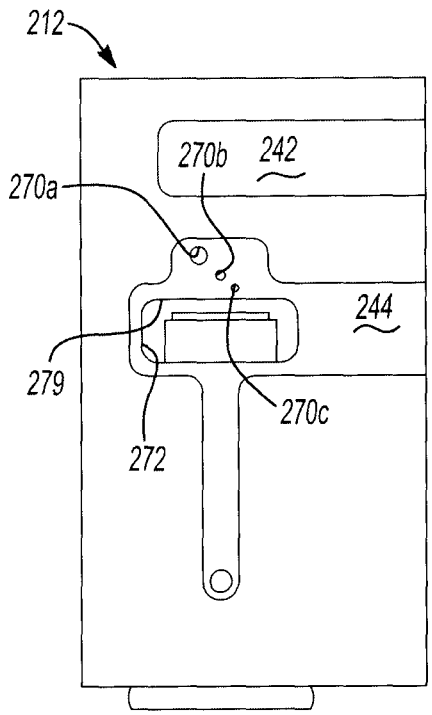
Figure 27:
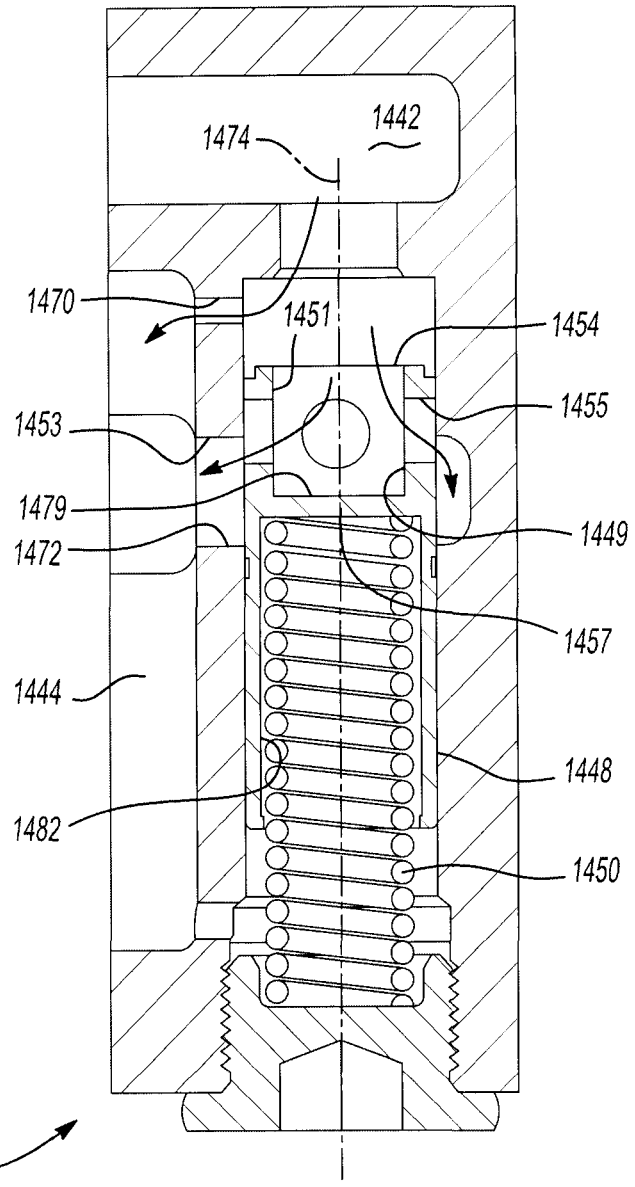
Figure 28:
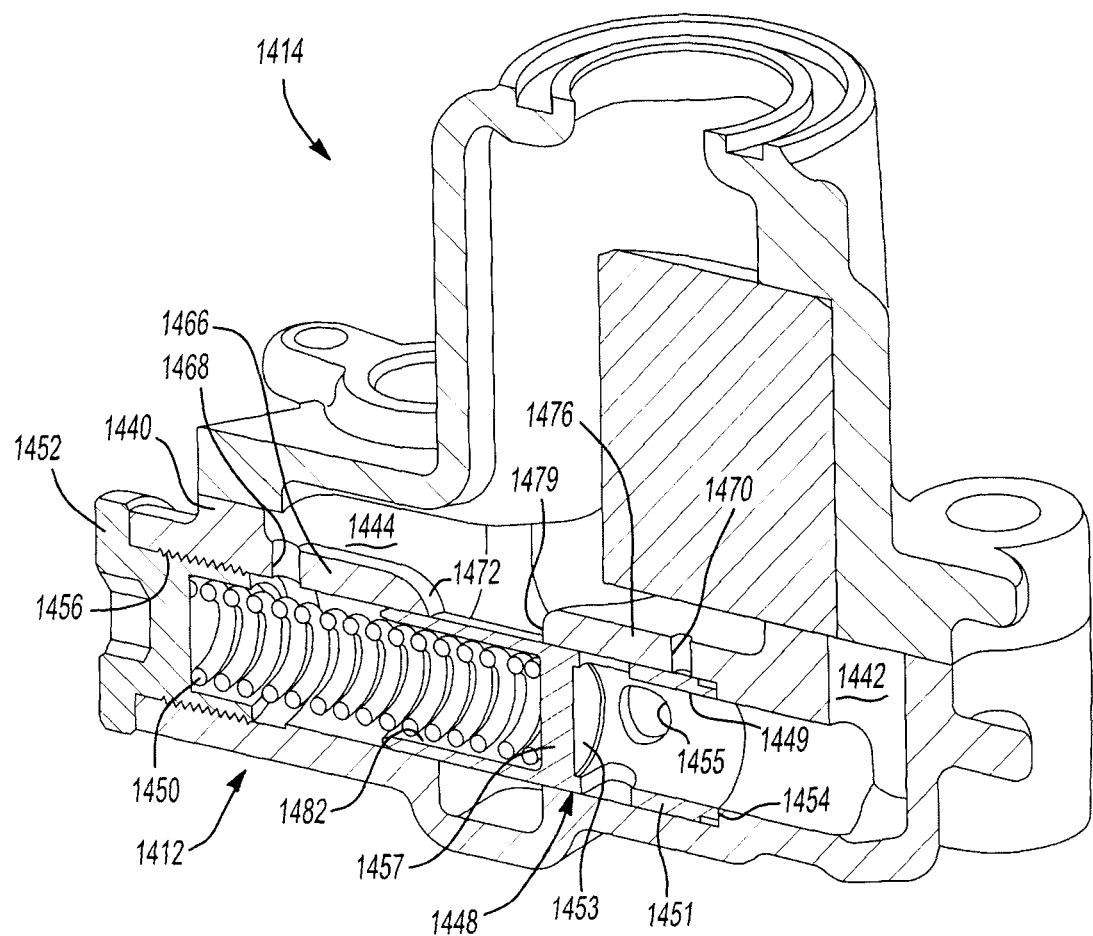
Figure 29:
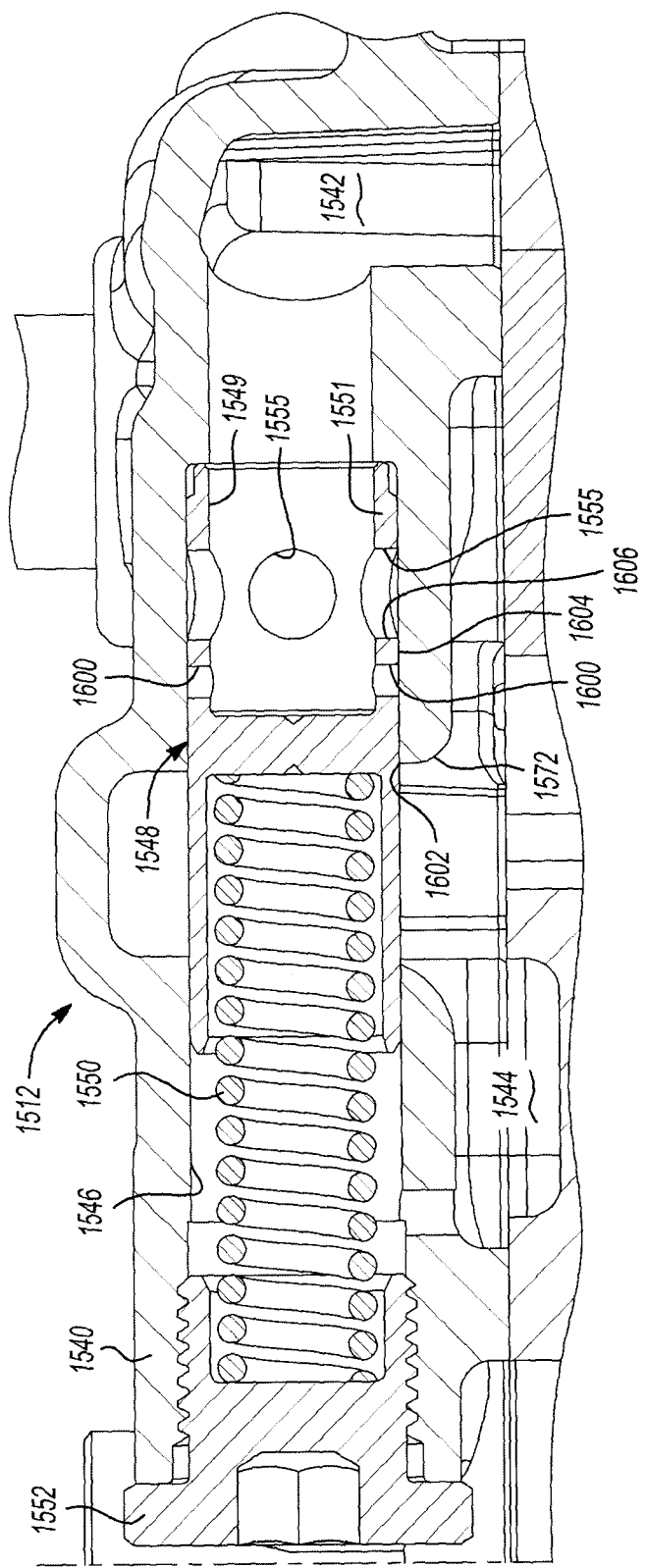
Figure 30:
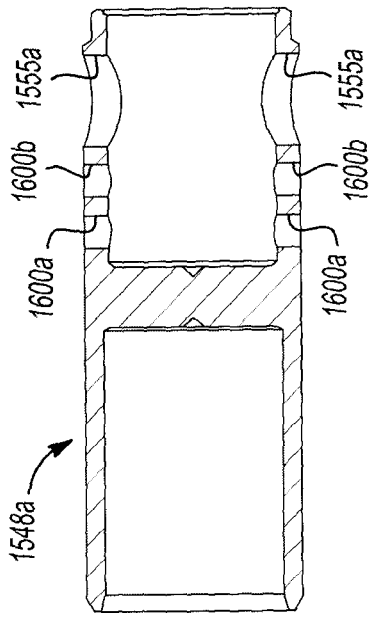

FIGS. 4a through 4e provide fragmentary cross-sectional side views of a pressure relief valve having a piston axially translated at different positions;

FIG. 5 is a graph depicting a discharge pressure versus pump speed relationship for a pump having a fixed hydraulic load resistance;

FIG. 6 is a graph depicting a discharge pressure versus discharge flow relationship for a pump operating a fixed speed with an increasing hydraulic load resistance;

FIG. 7 is a graph depicting a discharge pressure versus pump speed for a standard pressure relief valve compared to a pressure relief valve equipped with an axially offset orifice;

FIG. 8 is a graph depicting a discharge pressure versus discharge flow providing the same comparison as FIG. 7;

FIG. 9 is a fragmentary view of another pressure relief valve;

FIG. 10 is a fragmentary cross-sectional view of the pressure relief valve depicted in FIG. 9;

FIG. 11 is a graph showing discharge pressure versus discharge flow for similar pressure relief valves having multiple orifices;

FIG. 12 is a discharge pressure versus discharge flow graph;

FIG. 13 is a fragmentary view depicting a portion of a pressure relief valve;

FIG. 14 is another discharge pressure versus discharge flow graph;

FIG. 15 is a fragmentary view of a pressure relief valve providing a performance curve shown in FIG. 14;

FIGS. 16-22 are fragmentary views of different pressure relief valves having varying orifice configurations;

FIGS. 23-26 are fragmentary views of different pressure relief valves having alternative main spill aperture shapes;

FIG. 27 is a fragmentary cross-sectional view of another pressure relief valve;

FIG. 28 is a sectional fragmentary perspective view of a pump equipped with a pressure relief valve;

FIG. 29 is a fragmentary sectional view of an alternate pressure relief valve; and FIG. 30 is a cross-sectional view of an alternate piston.

Corresponding reference numerals indicate corresponding parts throughout the several views of the drawings.

DETAILED DESCRIPTION

Example embodiments will now be described more fully with reference to the accompanying drawings.

Figure 1:
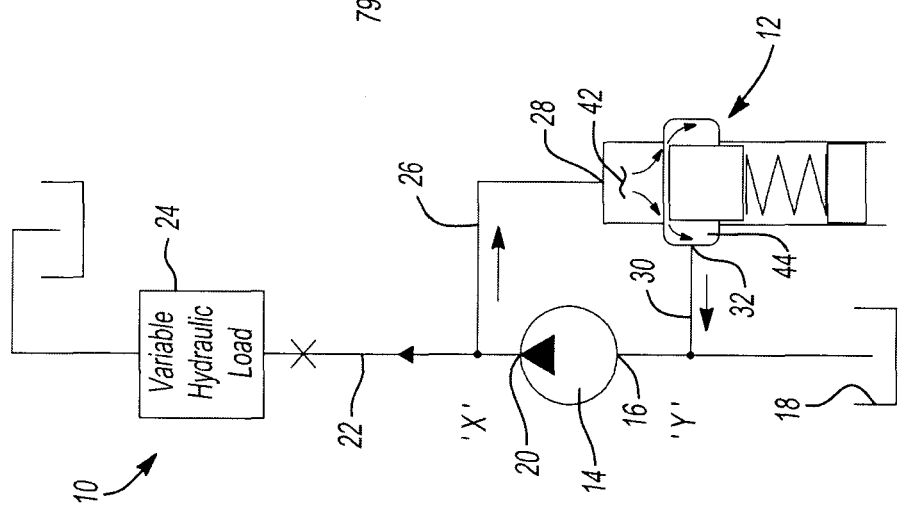
FIG. 1 is a schematic of a fluid pumping system equipped with a pressure relief valve constructed in accordance with the teachings of the present disclosure.

FIG. 1 is a schematic depicting an exemplary fluid pumping system 10 including a pressure relief valve 12 constructed in accordance with the teachings of the present disclosure. Fluid pumping system 10 includes a pump 14 depicted as a fixed displacement pump. It should be appreciated that pump 14 may also be a variable displacement pump without departing from the scope of the present disclosure. Pump 14 includes an inlet 16 in fluid communication with a fluid reservoir 18. Pump 14 also includes an outlet 20 providing pressurized fluid to a passageway or line 22 and a hydraulic load 24. The hydraulic load may include lubrication passageways associated with moving components of an engine (not shown) such as a valve train. Once the fluid has been transferred to hydraulic load 24, the fluid returns to fluid reservoir 18.

Fluid pumping system 10 also includes a passageway or line 26 providing pressurized fluid from outlet 20 to an inlet 28 of pressure relief valve 12. A return passageway 30 interconnects an outlet 32 of pressure relief valve 12 with inlet 16.

Figure 3:
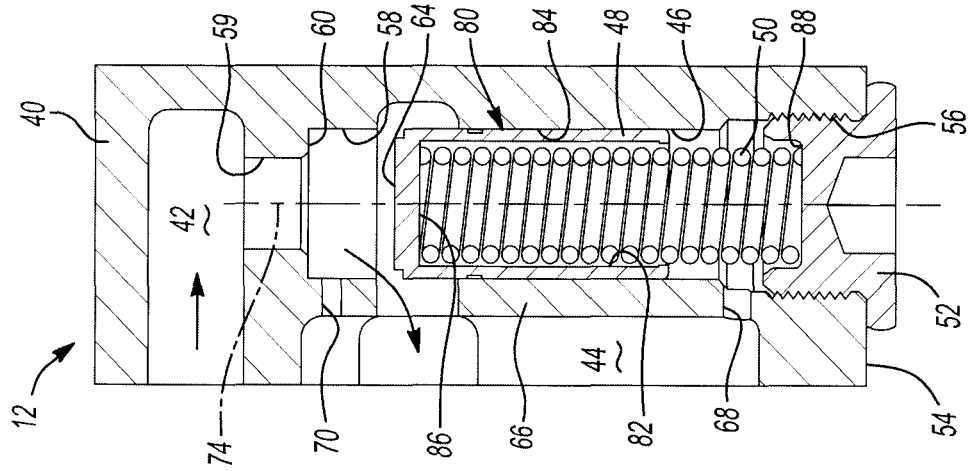
FIG. 3 is a fragmentary cross-sectional view of the pressure relief valve shown in FIG. 2.
Figure 2:
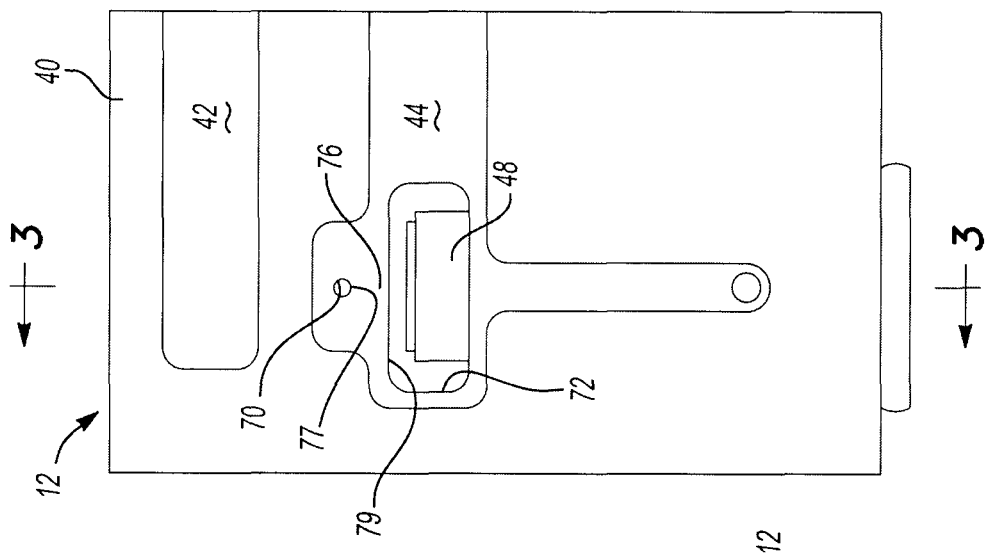
FIG. 2 is a fragmentary plan view of the pressure relief valve schematically depicted in FIG. 1.

Pressure relief valve 12 may be integrally formed with pump 14 and positioned within a common housing 40 as shown in FIG. 2. Housing 40 includes an inlet chamber 42 in communication with inlet 28 and an outlet chamber 44 in communication with outlet 32. Valve 12 includes a stepped bore 46 in housing 40 in which a piston 48 and a spring 50 are arranged. A plug 52 is threadingly engaged with housing 40 to cap or seal bore 46 and trap piston 48 and spring 50 within housing 40. It should be appreciated that plug 52 may alternatively be positioned at the opposite end of bore 46 and that the end of bore 46 containing plug 52 would become a blind bore and not extend through an end face 54 of housing 40.

Stepped bore 46 includes an enlarged diameter portion 56 including an internal thread in receipt of plug 52. An adjacent reduced diameter portion 58 is in slidable receipt of piston 48. Stepped bore 46 also includes a further reduced diameter portion 59 interconnecting inlet chamber 42 and the portion 58. A stop face 60 is formed at one end of bore portion 58. Piston 48 includes an and face 64 that is biased into engagement with stop face 60 by spring 50 when valve 12 is closed. A wall 66 separates bore portion 58 from outlet chamber 44. A vent or dampening aperture 68 extends through wall 66 to place bore 46 in fluid communication with outlet chamber 44. Vent 68 prevents hydraulic lock of piston 48 allowing the piston to axially translate within bore 46.

Housing 40 includes an orifice 70 and a main spill aperture 72 axially spaced apart from one another with reference to an axis of translation 74 of piston 48. Each of orifice 70 and main spill aperture 72 interconnect portion 58 with outlet chamber 44. A land 76 is a portion of wall 66 that is uninterrupted and axially positioned between a trailing edge 77 of orifice 70 and a leading edge 79 of main spill aperture 72.

Piston 48 is a substantially circular cylindrical member including an outer cylindrical surface 80 that is sized to closely meet with portion 58. Piston 48 includes a blind bore 82 in receipt of a portion of spring 50. Blind bore 82 includes a cylindrical surface 84 and an end surface 86. One end of spring 50 engages end surface 86 while an opposite end of spring 50 is positioned within a pocket 88 of plug 52.

FIGS. 4a-4e are useful to explain the operation of pressure relief valve 12. FIG. 5 represents a discharge pressure versus speed relationship obtained when pump 14 is operated with a fixed hydraulic load resistance placed in lieu of the variable hydraulic load 24 shown in FIG. 1. FIG. 6 represents a discharge pressure versus discharge flow relationship when pump 14 is operated at a constant speed and the hydraulic load 24 is varied from substantially no load at point 1 to a simulated dead-head condition at point 5.

Each of the numerals 1-5 in FIGS. 5 and 6 relate to different axial positions of piston 48 as depicted in FIGS. 4a-4e. In particular, FIG. 4a shows piston 48 at position 1 where end face 64 engages stop face 60 and valve 12 is closed. No fluid flows from inlet chamber 42 to outlet chamber 44. Position 2 is depicted in FIG. 4b. In FIG. 4b, piston 48 is axially displaced to the threshold or uppermost edge of orifice 70. Flow does not occur between inlet chamber 42 and outlet chamber 44 when piston 48 is located at position 2. With reference to FIGS. 5 and 6, pressure increases during pump operation as piston 48 travels from position 1 to position 2 due to an increase in pump speed and/or an increase in the hydraulic load resistance within system 10. The discharge pressure continues to increase until a sufficient pressure is generated to overcome the force provided by spring 50 at its closed position plus the increased force to axially translate piston 48 from position 1 to position 2.

As discharge pressure continues to increase, piston 48 moves from position 2 to position 3. At this time, pressurized fluid from inlet chamber 42 passes through orifice 70 into outlet chamber 44. Piston 48 continues to axially translate to position 3 at which orifice 70 is fully open. By reviewing FIG. 5, it should be appreciated that the provision of orifice 70 substantially modifies the shape of the curve by reducing the increase in discharge pressure per increase of pump speed.

As pump speed or hydraulic load continues to increase, piston 48 continues to axially travel from position 3 toward position 4. During this portion of travel, the pressure of fluid acting on end face 64 increases to overcome the increasing load provided by spring 50 due to further compression of the spring. At position 4, as shown in FIG. 4d, piston 48 is positioned at the threshold of main spill aperture 72. At position 4, fluid continues to flow through orifice 70 but does not flow through main spill aperture 72. When hydraulic load and/or pump speed continue to increase, piston 48 travels from position 4 to position 5. During this portion of piston travel, fluid travels from inlet chamber 42 to outlet chamber 44 through both orifice 70 and main spill aperture 72. The rate of increase in discharge pressure per increase in pump speed or increase in hydraulic load is once again substantially reduced. This reduced rate of discharge pressure increase is depicted in both FIGS. 5 and 6 as the line segment between position 4 and position 5.

FIGS. 7 and 8 compare the curves of FIGS. 5 and 6 with traces representing standard pressure relief valve operation. In FIG. 7, the lower trace 100 represents a discharge pressure versus pump speed trace for a system equipped with pressure relief valve 12. Trace 102 relates to discharge pressure versus pump speed for a typical pressure relief valve having a main spill way but without an axially spaced orifice. FIG. 8 shows a discharge pressure versus discharge flow trace 104 corresponding to the operation of pressure relief valve 12. A trace 106 represents the operation of the same standard pressure relief valve associated with trace 102 shown in FIG. 7. The shaded area between the curves represents an amount of energy saved due to reducing the pressure generated by pump 14 through the use of pressure relief valve 12. As is shown in FIGS. 7 and 8, the reduction in pressure at low to moderate engine and pump operating speeds may be substantial. A corresponding substantial energy savings may be realized.

FIGS. 9 and 10 depict another pressure relief valve identified at reference numeral 112. Valve 112 is substantially similar to valve 12 with the exception that three orifices 170a, 170b and 170c extend through wall 166 instead of singular orifice 70 shown in FIG. 2. Accordingly, the remaining features of relief valve 112 will be identified with like numerals increased by 100.

Orifices 170a, 170b and 170c each have the same shape and diameter and are positioned adjacent one another at a common axial distance from stop face 160. FIG. 11 depicts the change in the discharge pressure versus discharge flow relationship due to the addition of not only a singular orifice but each additional orifice such as 170a, 170b and 170c. In particular, the discharge pressure versus discharge flow trace 106 represents the output characteristics of a system equipped with the standard pressure relief valve having no axially offset orifice. Trace 104 relates to a singular orifice. A trace 203 defines the discharge pressure versus discharge flow relationship for a valve equipped with two orifices aligned along a common transverse axis. Trace 205 relates to the discharge pressure versus discharge flow characteristics of pressure relief valve 112 having three orifices 170a, 170b, 170c positioned as shown in FIGS. 9 and 10.

Multiple orifices may be used to shape the performance curve as desired. The size, shape and axial position of individual orifices may be varied to tailor the performance characteristics of the pressure relief valve. FIG. 12 displays trace 104 with portions of the trace being identified with letters A. B and C. By changing geometrical aspects of the pressure relief valve, characteristics of the discharge pressure versus discharge flow curve may be adjusted. To vary dimension A on the discharge pressure versus discharge flow curve, the total orifice area may be changed. As previously shown in FIG. 11, distance A varies by adding orifices 170a, 170b and 170c. Characteristic dimension B may be varied by changing dimension D shown in FIG. 13 and/or varying the rate of spring 150. Discharge pressure versus discharge flow characteristic C may be modified by adjusting dimension E as shown in FIG. 13 and/or varying the rate of spring 150.

FIGS. 14 and 15 relate to another pressure relief valve 212 that is substantially similar to valve 12 and valve 112. Valve 212 includes a first orifice 270a, a second orifice 270b and a third orifice 270c. First orifice 270a includes a greater diameter than orifices 270b, 270c. Furthermore, orifice 270a is positioned a first axial distance from a leading edge 279 of main spill aperture 272. Second orifice 270b is closer to edge 279 while orifice 270c is positioned even closer to leading edge 279 of main spill aperture 272. The diameters of the orifices also reduce in size from first orifice 270a being largest and third orifice 270c being the smallest. FIG. 14 depicts how this arrangement once again varies the discharge pressure versus discharge flow trace.

Figure 16:
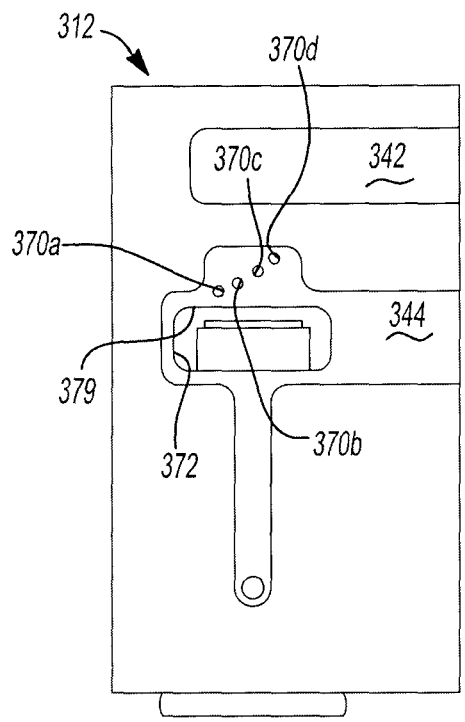
Figure 17:
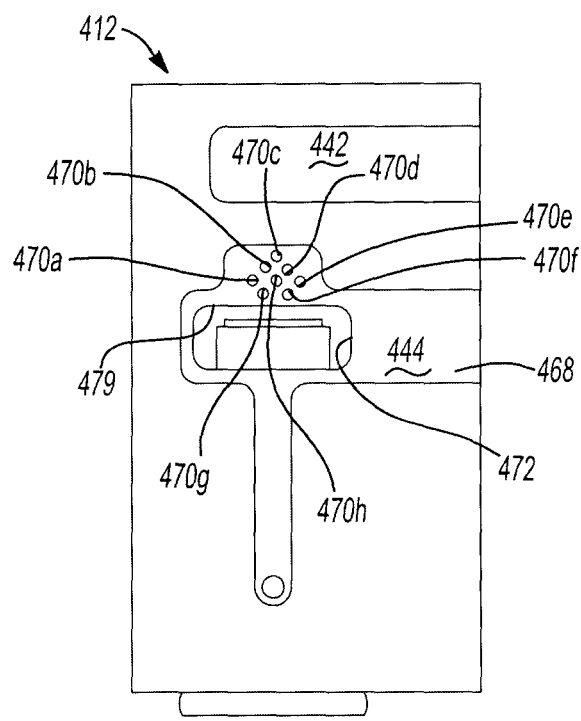
Figure 18:
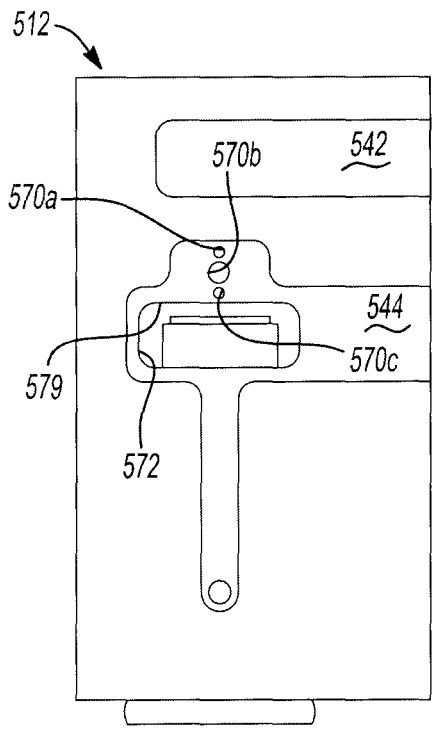
Figure 19:
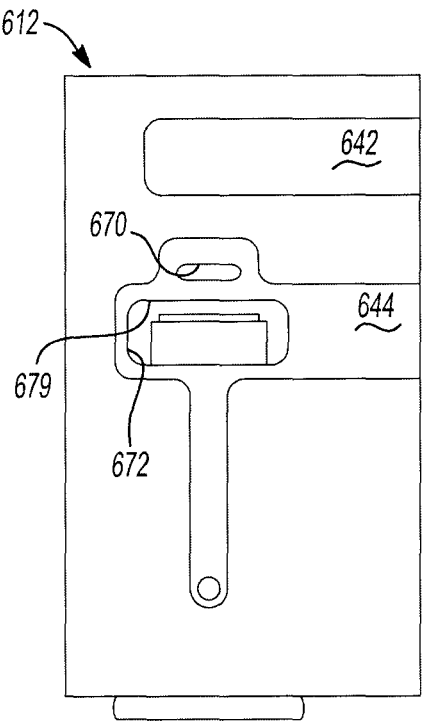
Figure 20:
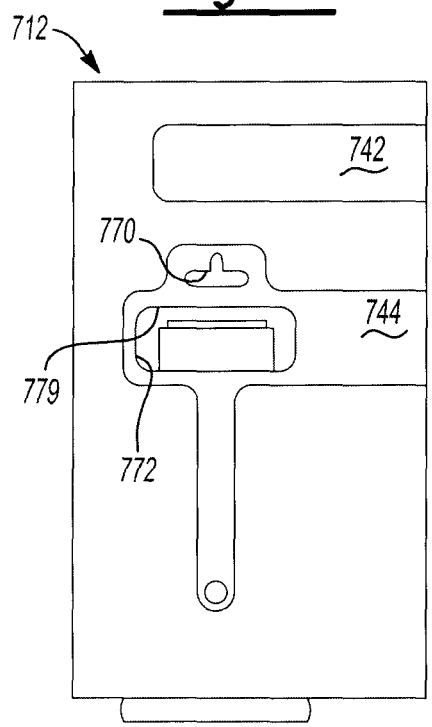

FIGS. 16-18 provide examples of other pressure relief valves 312, 412 and 512, respectively, having multiple circular orifices positioned in staggered axial locations. Valve 312 is equipped with orifices 370a, 370b, 370c and 370d, being commonly sized and positioned at different axial locations. FIG. 17 shows valve 412 having orifices 470a-470h. FIG. 18 relates to valve 512 having orifices 570a, 570b and 570c. Orifice 570b has a larger diameter than orifices 570a and 570c.

Figure 21:
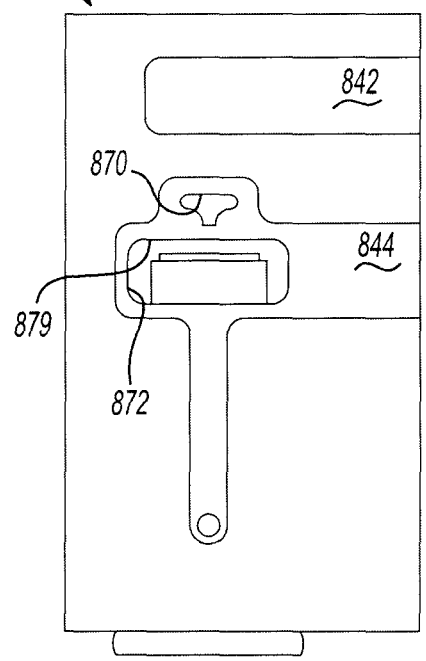
Figure 22:
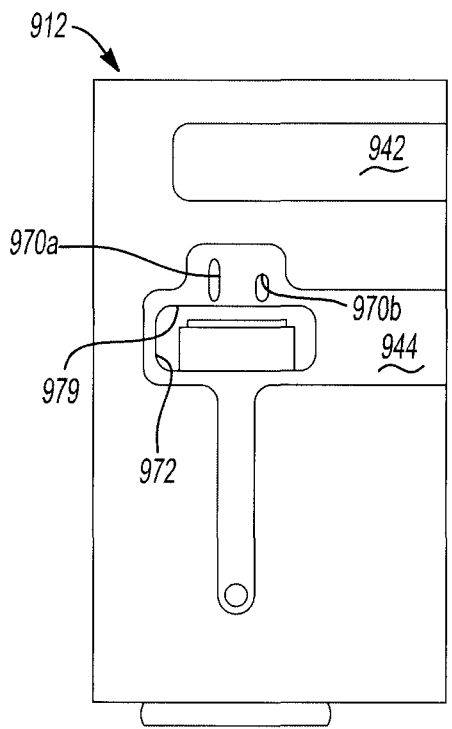

FIGS. 19-22 depict pressure relief valves 612, 712, 812 and 912, respectively. These valves include orifices having non-circular aperture shapes. In particular, valve 612 includes an elongated slot-like orifice 670. Valve 712 includes a hat-shaped orifice 770. FIG. 21 depicts valve 812 having a V-shaped orifice 870. FIG. 22 shows valve 912 having a first elongated vertically oriented orifice 970a positioned adjacent to a somewhat smaller elongated orifice 970b.

Figure 23:
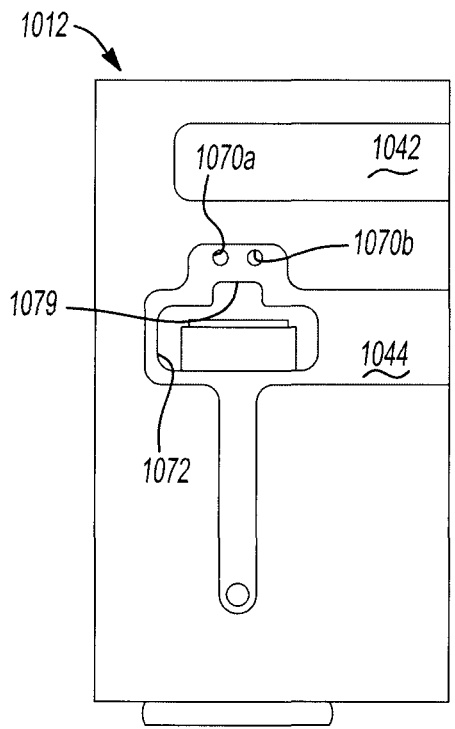
Figure 24:
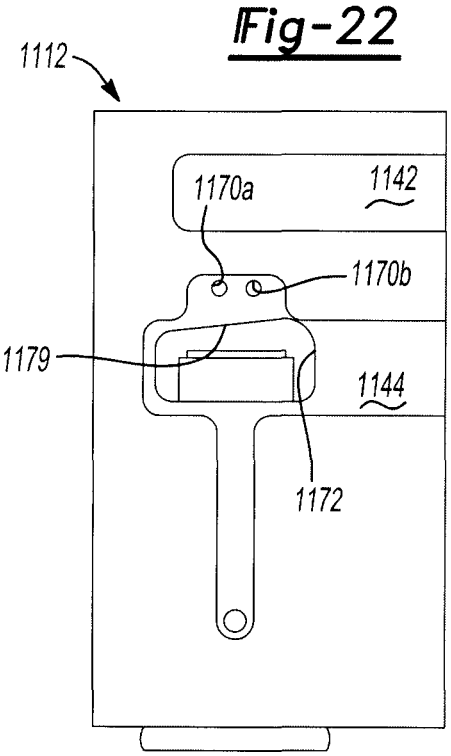
Figure 25:
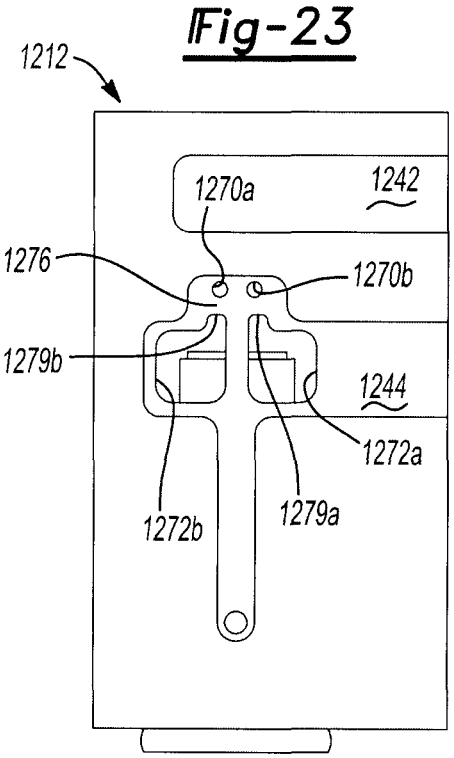

FIGS. 23-26 depict various pressure relief valves that are substantially similar to one another with the exception that the shape of the main spill aperture has been changed. In the prior Figures, the main spill aperture was shaped as a transversely oriented rectangular shape having rounded corners. FIG. 23 depicts a main spill aperture 1072 having a pocket portion with an offset leading edge 1079. FIG. 24 shows valve 1112 having a main spill aperture 1172 with a sloped leading edge 1179.

Pressure relief valve 1212 includes a first main spill aperture 1272a and a second main spill aperture 1272b laterally spaced apart from one another. Aperture 1272a includes an offset leading edge 1279a. Aperture 1272b includes an offset leading edge 1279b. It should be appreciated that regardless of the number of main spill apertures or their shape, land 1276 remains axially positioned between main spill apertures 1272a, 1272b and orifices 1270a and 1270b. The provision of a land is common throughout each of the variations depicted.

Figure 26:
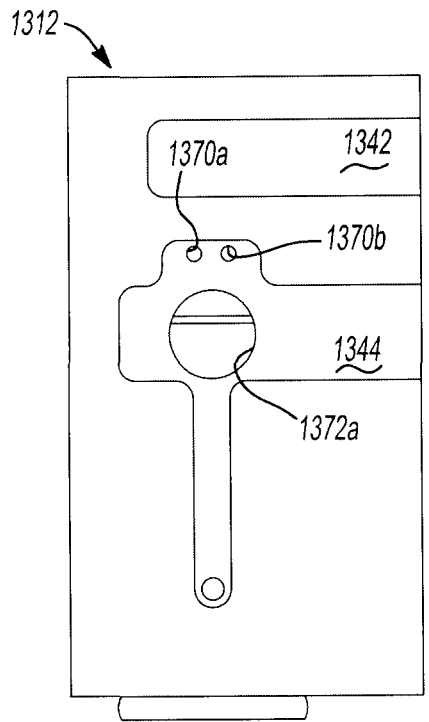

FIG. 26 shows pressure relief valve 1312 including a circular main spill aperture 1372. By modifying the shape and axial position of main spill apertures 1072, 1172, 1272 and 1372, distance D shown in FIG. 13 is varied. Feature B of FIG. 12 is varied accordingly. By modifying the shape of the main spill aperture, the slope of the discharge pressure versus discharge flow trace between points 4 and 5 is varied. Changing the size, shape and axial location of the main spill aperture provides a pressure relief valve manufacturer additional options to vary the shape of the discharge pressure versus discharge flow and discharge pressure versus speed traces.

FIGS. 27 and 28 relate to another pressure relief valve 1412 that is substantially similar to pressure relief valve 12. According, like elements will be identified with similar numerals beginning with 1400. Pressure relief valve 1412 is integrally formed with pump 1414 and includes a modified piston 1448 having a recess 1449 formed in end face 1454 at one end of piston 1448. Recess 1449 includes a substantially cylindrical side wall 1451 intersecting an uninterrupted bottom surface 1479. A plurality of apertures 1455 are circumferentially spaced apart from one another extending through the side wall 1451 of piston 1448.

FIG. 27 corresponds to axial position 5 of FIG. 4e where the main spill aperture is open. In the arrangement shown in FIG. 27, pressurized fluid travels from inlet chamber 1442, through orifice 1470 and into outlet chamber 1444. When piston 1448 is at position 5, another fluid pathway is open. Specifically, fluid flows from inlet chamber 1442, into recess 1449, through apertures 1455, through main spill aperture 1472 and into outlet chamber 1444. This design allows a leading edge 1479 of main spill aperture 1472 to be positioned axially further from orifice 1470. The available space for spring 1450 is also changed due to the inclusion of a wall 1457 separating blind bore 1482 and recess 1449.

FIG. 29 relates to an alternate pressure relief valve 1512 that shares some features with pressure relief valve 1412, as well as others. As such, similar elements will be identified with like numerals beginning with 1500. Pressure relief valve 1512 differs from the previously described relief valves in that housing 1540 is not equipped with an orifice such as orifice 70 of pressure relief valve 12. Housing 1540 includes an inlet chamber 1542 and an outlet chamber 1544. A main spill aperture 1572 extends through housing 1540 interconnecting inlet chamber 1542 and outlet chamber 1544.

A plug 1552 is threadingly engaged with housing 1540 to trap a spring 1550 and a piston 1548 within a bore 1546. Piston 1548 includes a plurality of apertures 1555 circumferentially spaced apart from another and extending through a side wall 1551 of piston 1548. Piston 1548 also includes a plurality of circumferentially spaced apart orifices 1600 axially spaced apart from apertures 1555.

FIG. 29 depicts piston 1548 at the most retracted axial position where flow between inlet chamber 1542 and outlet chamber 1544 is blocked. As piston 1548 translates axially to the left when viewed in FIG. 29, orifice 1600 will first pass an edge 1602 of main spill aperture 1572. Fluid flows from inlet chamber 1542 into a recess 1549 of piston 1548, through orifices 1600, through main spill aperture 1572 and into outlet chamber 1544.

As fluid pressure acting on piston 1548 increases, the piston continues to axially travel toward plug 1552. It should be appreciated that during this portion of the operation of valve 1512, fluid flows through orifices 1600 but not apertures 1555. The axial distance between orifices 1600 and apertures 1555 and the force provided by spring 1550 define the pressure relief valve operational characteristics. After piston 1548 translates the axial extent of a land 1604 positioned between orifice 1600 and aperture 1555, a leading edge 1606 of aperture 1555 will pass edge 1602 to begin fluid flow through apertures 1555. Pressurized fluid flows through orifices 1600 and apertures 1555.

The operating characteristics of valve 1512 are substantially the same as valve 12 and as depicted in FIGS. 5 and 6. The shape of the traces may be modified in the same manner as any of the previously described valves except that any additional orifices or modifications to orifice size, shape, or axial position are provided on piston 1548 instead of housing 1540. For each of the alternate embodiments described relating to valve 1512, only one main spill aperture 1572 is provided with no orifice being formed in housing 1540. By constructing valve 1512 in this manner, a family of pressure relief valves having different characteristics may be provided by simply replacing piston 1548 with a similar piston having a different orifice and/or aperture configuration.

FIG. 30 depicts an exemplary alternate piston 1548a having first orifices 1600a, second orifices 1600b and apertures 1555a axially spaced apart from one another. A common housing 1540 may be used for each of the different pressure relief valves. Reduced costs relating to the machining of housing 1540 may be realized.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A pressure relief valve, comprising:
a housing including an inlet chamber adapted to be in communication with an outlet of a pump and an outlet chamber adapted to be in communication with a pump inlet, the housing including a bore having a first end in communication with the inlet chamber, a plurality of orifices in communication with the outlet chamber, and a main spill aperture axially spaced apart from the plurality of orifices and in communication with the outlet chamber;
a piston axially moveable within the bore between a first position whereat the piston seals the inlet chamber from the outlet chamber, a second position whereat the inlet and outlet chambers are in fluid communication with one another via only the plurality of orifices, and a third position whereat the inlet and outlet chambers are in fluid communication with one another via the plurality of orifices and the main spill aperture; and
a spring biasing the piston toward the first position;
where in each orifice of the plurality of orifices is axially spaced apart from adjacent orifices of the plurality of orifices, and wherein at least one of the plurality of orifices having a diameter being different from a diameter of the other orifices of the plurality of orifices.

2. The pressure relief valve of claim 1, wherein the housing includes an aperture aligned with the bore, the aperture being closed by a plug attached to the housing, the spring having one end engaging the plug and an opposite end engaging the piston.

3. The pressure relief valve of claim 2, wherein the housing includes a wall separating the bore from the outlet chamber, the plurality orifices and the main spill aperture extending through the wall.

4. The pressure relief valve of claim 3, wherein the wall includes an uninterrupted land separating the plurality of orifices and the main spill aperture.

5. The pressure relief valve of claim 1, wherein the piston includes first and second coaxially aligned recesses, the first recess being in receipt of the spring, the second recess being in communication with the inlet chamber, the piston including a transversely extending aperture through which fluid flows when the piston is at the third position.

6. The pressure relief valve of claim 1, wherein the piston allowing fluid to flow through the plurality of orifices but not the main spill aperture when located at an axial position between the second and third positions.

7. The pressure relief valve of claim 1, wherein an axial distance between adjacent orifices of the plurality of orifices is adjustable to vary a discharge pressure versus discharge flow relationship of the pump.

8. The pressure relief valve of claim 1, wherein each of the plurality of orifices having a diameter being different from a diameter of each of the other orifices of the plurality of orifices.

9. The pressure relief valve of claim 8, wherein the different diameters of the plurality of the orifices reduce in size from the first end towards the main spill aperture.

10. The pressure relief valve of claim 1, wherein the main spill aperture having a pocket portion with an offset leading edge.

11. The pressure relief valve of claim 1, wherein the main spill aperture having a sloped leading edge.

12. The pressure relief valve of claim 1, wherein the main spill aperture including a first main spill aperture and second main spill aperture laterally spaced apart from one another by a land.

13. The pressure relief valve of claim 12, wherein each of the first and second main spill apertures includes an offset leading edge.

14. A pressure relief valve, comprising:
a housing including an inlet chamber adapted to be in communication with an outlet of a pump and an outlet chamber adapted to be in communication with a pump inlet, the housing including a bore having a first end in communication with the inlet chamber, a plurality of orifices in communication with the outlet chamber, and a main spill aperture axially spaced apart from the plurality of orifices and in communication with the outlet chamber;
a piston axially moveable within the bore between a first position whereat the piston seals the inlet chamber from the outlet chamber, a second position whereat the inlet and outlet chambers are in fluid communication with one another via only the plurality of orifices, and a third position whereat the inlet and outlet chambers are in fluid communication with one another via the plurality of orifices and the main spill aperture; and
a spring biasing the piston toward the first position;
wherein each orifice of the plurality of orifices is axially and radially spaced apart from adjacent orifices of the plurality of orifices, and wherein at least one of the plurality of orifices having a diameter being different from a diameter of the other orifices of the plurality of orifices.

15. The pressure relief valve of claim 14, wherein an axial distance between adjacent orifices of the plurality of orifices is adjustable to vary a discharge pressure versus discharge flow relationship of the pump.

16. The pressure relief valve of claim 14, wherein the piston allowing fluid to flow through the plurality of orifices but not the main spill aperture when located at an axial position between the second and third positions.

17. A pressure relief valve, comprising:
a housing including an inlet chamber adapted to be in communication with an outlet of a pump and an outlet chamber adapted to be in communication with an inlet of the pump, the housing including a bore having a first end in communication with the inlet chamber, a plurality of orifices in communication with the outlet chamber, and a main spill aperture axially spaced apart from the plurality of orifices and in communication with the outlet chamber;
a piston axially moveable within the bore between a first position whereat the piston seals the inlet chamber from the outlet chamber, a second position whereat the inlet and outlet chambers are in fluid communication with one another via only the plurality of orifices, and a third position whereat the inlet and outlet chambers are in fluid communication with one another via the plurality of orifices and the main spill aperture; and
a spring biasing the piston toward the first position;
wherein each orifice of the plurality of orifices is axially spaced apart from adjacent orifices of the plurality of orifices, and wherein the axial distance between adjacent orifices of the plurality of orifices is adjustable to vary a discharge pressure versus discharge flow relationship of the pump.

18. A pressure relief valve, comprising:
a housing including an inlet chamber adapted to be in communication with an outlet of a pump and an outlet chamber adapted to be in communication with an inlet of the pump, the housing including a bore having a first end in communication with the inlet chamber, a plurality of orifices in communication with the outlet chamber, and a main spill aperture axially spaced apart from the plurality of orifices and in communication with the outlet chamber;
a piston axially moveable within the bore between a first position whereat the piston seals the inlet chamber from the outlet chamber, a second position whereat the inlet and outlet chambers are in fluid communication with one another via only the plurality of orifices, and a third position whereat the inlet and outlet chambers are in fluid communication with one another via the plurality of orifices and the main spill aperture; and
a spring biasing the piston toward the first position;
wherein each orifice of the plurality of orifices is axially and radially spaced apart from adjacent orifices of the plurality of orifices, and wherein the piston allows fluid to flow through the plurality of orifices but not the main spill aperture when located at an axial position between the second and third positions.

* * * * *

UNITED STATES PATENT AND TRADEMARK OFFICE
CERTIFICATE OF CORRECTION

PATENT NO. : 8,967,195 B2  
APPLICATION NO. : 13/882546  
DATED : March 3, 2015  
INVENTOR(S) : Williamson et al.

Page 1 of 1

It is certified that error appears in the above-identified patent and that said Letters Patent is hereby corrected as shown below:

In the specification

Column 3, Line 61, change "an and face 64" to "an end face 64".  
Column 5, Line 46, change "letters A." to "letters A,".  
Column 8, Line 27, change "where in each" to "wherein each".  
Column 8, Line 39, change "the plurality orifices" to "the plurality of orifices".

In the claims  
Column 8, Line 63, Claim 9, change "plurality of the orifices" to "plurality of orifices".  
Column 9, Line 4, Claim 12, change "aperture and second" to "aperture and a second".

Signed and Sealed this  
Twenty-ninth Day of December, 2015

Michelle K. Lee  
*Director of the United States Patent and Trademark Office*